(12) United States Patent
Shteyn

(10) Patent No.: US 6,499,062 B1
(45) Date of Patent: Dec. 24, 2002

(54) SYNCHRONIZING PROPERTY CHANGES TO ENABLE MULTIPLE CONTROL OPTIONS

(75) Inventor: Yevgeniy Eugene Shteyn, Cupertino, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/213,527

(22) Filed: Dec. 17, 1998

(51) Int. Cl.$^7$ ................................................ G06F 9/54
(52) U.S. Cl. .......................................... 709/315; 700/19
(58) Field of Search ......................... 709/248, 310–320, 709/328–330; 700/12, 19, 20; 710/15–19

(56) References Cited

U.S. PATENT DOCUMENTS

| | | | | |
|---|---|---|---|---|
| 5,467,264 A | * | 11/1995 | Rauch et al. ................... | 700/12 |
| 5,787,442 A | | 7/1998 | Hacherl et al. ................. | 707/201 |
| 5,959,536 A | * | 9/1999 | Chambers et al. ............. | 340/636 |
| 6,108,717 A | * | 8/2000 | Kimura et al. .................. | 710/8 |
| 6,144,888 A | * | 11/2000 | Lucas et al. .................... | 700/19 |
| 6,199,136 B1 | * | 3/2001 | Shteyn .......................... | 709/328 |
| 6,292,849 B1 | * | 9/2001 | Kimura et al. .................. | 710/8 |
| 6,304,922 B2 | * | 10/2001 | Kimura et al. .................. | 710/8 |
| 6,347,342 B1 | * | 2/2002 | Marcos et al. ................. | 709/315 |

FOREIGN PATENT DOCUMENTS

| | | | | |
|---|---|---|---|---|
| EP | 000713178 A1 | * | 5/1996 | .......... G06F/9/46 |
| WO | WO 98/16886 | * | 4/1998 | .......... G06F/13/10 |

* cited by examiner

*Primary Examiner*—St. John Courtenay, III
(74) *Attorney, Agent, or Firm*—Michael Schmitt

(57) ABSTRACT

Components in an information processing system are represented by software objects whose properties can be changed through function calls. Setting a property of an object controls the associated component. Properties are connected through routes that propagate state changes throughout the system without the need for a running client application. Two-way property routes are used to keep consistence among a controlled object and multiple controlling objects without the risk of endless loops. To achieve this, the two-way route is executed to change a state of a specific one of the properties upon a change of state of another one of the properties if the change of state of the other property was caused by an effect other than the route itself.

5 Claims, 6 Drawing Sheets

SYNCHRONIZING PROPERTY CHANGES TO ENABLE MULTIPLE CONTROL OPTIONS

FIELD OF THE INVENTION

The invention relates to an information processing system and a method, in particular, but not exclusively, for control of consumer electronics equipment in the home or office environment.

BACKGROUND ART

Consider a computing model based on Component Object Model (COM/DCOM) technology of Microsoft. For more information, see, e.g., the Component Object Model Specification version 0.9 of October 1995 as supplied by Microsoft, herein incorporated by reference. COM is object-oriented. An object has properties that represent control functionalities of an associated electronic device as exposed to a software application. A state change of an object as a consequence of an event from outside is passed on to the software application. The application manipulates the objects by changing or setting their properties. When the application modifies a property of an object associated with a certain physical device a command is sent to the associated device.

COM is a generic mechanism allowing applications to communicate in a consistent way and is a framework for developing and supporting program component objects. It provides capabilities similar to those defined in CORBA (Common Object Request Broker Architecture), the framework for the interoperation of distributed objects in a network. OLE (object linking and embedding) provides services for the compound document that users see on their display, COM provides the underlying services of interface negotiation and event services (putting one object into service as the result of an event that has happened to another object). In this implementation clients are modeled as OLE Automation objects (abstract representations) that use properties to expose controls and events to signal state changes. OLE Automation is a COM technology that enables scripting and late binding of clients to servers. OLE Automation provides communication with other programs through calls to features (commands and queries) that the programs have made available for external use. Before using an object, a client application has first to obtain the object's interface pointer. The interface pointer is obtained through the network's directory by binding the object's name or by enumerating devices. Standard COM API's for moniker binding can be used. References to objects can be obtained by calling GetObject or CoGetObject with a string specifying the desired device's name or ID. The application can then manipulate the object by setting or retrieving its properties through "set property" calls to the appropriate properties. When an application sets or modifies a property of an object corresponding with a device the property-setting operation or modification operation is converted into a command that is sent across the network to the relevant device. The objects may differ in implementation, but expose a similar property-based model to client applications running on a controller, e.g., a PC with a Windows-based operating system.

OBJECT OF THE INVENTION

Consider an information processing system comprising such objects (i.e., a collection of software modules, e.g., as introduced above) and client software applications that control the interaction among the objects. For example, the system comprises a home automation sub-system with audio/video equipment for entertainment, a security sub-system and an inhouse-climate control sub-system. These sub-systems and their components are modeled as, e.g., OLE Automation objects that use properties to expose their controls to application clients and events to signal state changes to the application clients. The sub-systems may use different communication protocols for their control signals. Accordingly, since they cannot communicate with each other directly, they communicate at the object-level. A client application could register for notification of changes to the "state" property of a first object representing a first (software) sub-system or first device and respond by setting a specific property of a second object representing a second sub-system or second device. However, the client application would need to be running all the time to provide this interaction. An alternative solution is therefore to specify that, whenever a change occurs to a property of a first object, the property's new value be propagated as a SetProperty call to a property of a second object. This mechanism is being referred to as a property route. A property route interconnects objects and is registered at the network's directory as a system-wide OLE Automation object itself. Registering a route creates a link between properties, typically, but not necessarily, between properties of different objects. Whenever a first property changes, the change triggers a call to change a second property via the registered route interconnecting these properties. For more background on a home automation system of the above kind see, for example, Ser. No. 09/146,020 filed Sep. 2, 19998 for Yevgeniy Shteyn for "LOW DATA-RATE NETWORK REPRESENTED ON HIGH DATA-RATE HAVi-NETWORK", herein incorporated by reference.

Now, consider such a system with an object, a property of which is controllable through a state change from each of multiple other objects via property routes. Consider, for example, a lighting system wherein a light is controllable through two switches at two different locations. The two switches are represented by first and second software objects and the light is represented by a third software object. A first client application registers a first property route so that a change of a state of the first switch object propagates to the third light object to cause a corresponding state change of its brightness property. A second application registers a second property route to control the brightness of the light through a state change of the second switch object. Now, when the second switch changes its state to "ON", the light's brightness goes to 100%. The state of the first switch is not updated, unless a third route has been registered for propagating the light's brightness state to the first switch. However, in many cases such behavior seems counter-intuitive as it requires a conscious effort from the user or application developer to keep the system synchronized. It also requires the system to use complicated logical rules to avoid looping route propagation. The state change of the light propagated to the first object may cause a call from the first switch object to the light object and thus a change in its brightness, etc.

As another example, consider a home entertainment system, wherein a particular functionality (e.g., sound volume) of an apparatus is controllable both through a physical slider at a control panel, and through a remote control device. Assume that the slider and remote control device are represented by first and second software objects and that the controllable functionality of the equipment is represented by a third software object. A first client application registers a first property route so that a change of a state of the slider object propagates to the third object to cause a corresponding state change in the volume property. A second application registers a second property route to control the sound volume through a state change of the object associated with the remote control. In order to keep the first, second and third object synchronized, one could register routes that propagate the state changes of the apparatus to the controls. This, however, renders the control complicated, as in the light case above, and requires checking for endless loops.

The inventor has realized that the user or the application developer has to make an effort in order to keep the behavior of the system's components synchronized. The inventor has also realized that it further a requires the system to use a complicated logic rule base in order to prevent the system from entering an endless loop.

It is therefore an objective of the invention to provide a system and a method for controlling physical components through their representations as software objects that facilitates the synchronizing and that avoids endless loops.

SUMMARY OF THE INVENTION

To this end, the invention provides an information processing system comprising multiple functionalities, e.g., components of physical devices or services to or from such a component or device. Each respective one of these functionalities is represented by a respective software object. Each software object has one or more properties whose state or parameter value can be changed via an appropriate message (call, command, etc.). The system comprises a route manager through which a two-way property route is invoked. Executing the route enables keeping respective states of the respective properties that are linked through this route consistent with each other. To achieve this the route is executed to change a state of a specific one of the properties upon a change of state of another one of the properties if the change of state of the other property was caused by an effect other than the route itself.

The invention is based on the insight that the conditional execution as specified by the invention is a simple and effective way to avoid endless loops and uncontrolled propagation of state changes through the The invention also relates to a method of enabling controlling an information processing system. The system has first and second functionalities that are represented by first and second software objects, respectively. The first and second properties have first and second settable properties, respectively. The method comprises enabling invoking a property route between the first and second properties for enabling keeping states of the properties consistent with each other; enabling executing the route to change the state of the first property upon a change of the state of the second property if the change of the state of the second property was caused by an effect other than the route itself; and enabling executing the route to change the state of the second property upon a change of the state of the first property if the change of the state of the first property was caused by an effect other than the route itself.

The expressions "enabling invoking" and "enabling executing" as used herein cover not only the consequences of user-interaction with the system, but also the supply of software and/or hardware components to the end-user to allow the system to show the behavior as specified.

The invention enables conditional state changes of software objects interconnected by routes, e.g., so as to keep their states consistent with each other. The mechanism proposed by the invention guarantees this consistency regardless of the direction of propagation of the state change along the route, herein after referred to as a two-way route.

Note that the invention is not restricted to COM, but can be used in any object-oriented software environment where changes in states can be propagated among objects without the need for a running client application.

BRIEF DESCRIPTION OF THE DRAWINGS

The invention is explained by way of example and with reference to the accompanying drawings, wherein.

Throughout the drawing, the same reference numerals indicate similar or corresponding features.

PREFERRED EMBODIMENTS

Figure 1:
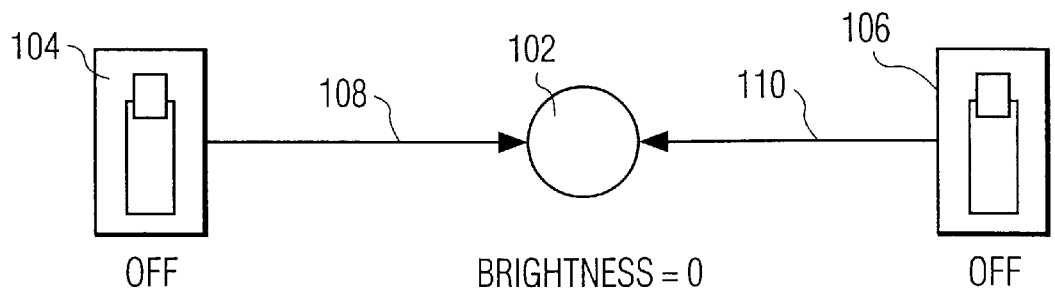
FIGS. 1–3 are diagrams illustrating one-way property route operation.
Figure 2:
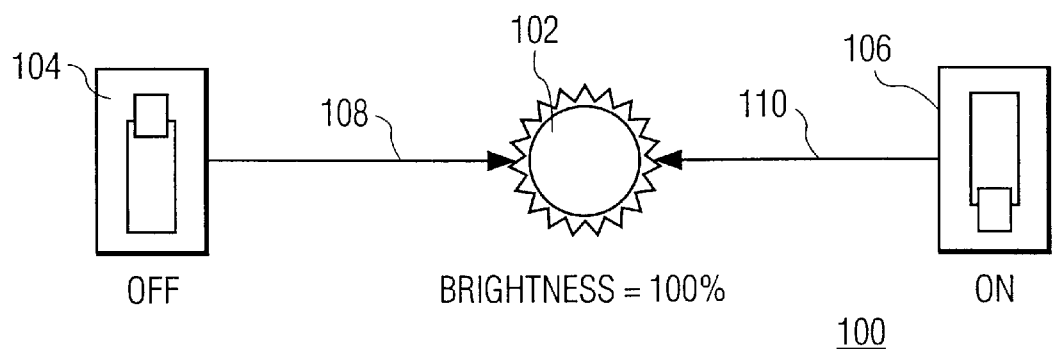
Figure 3:
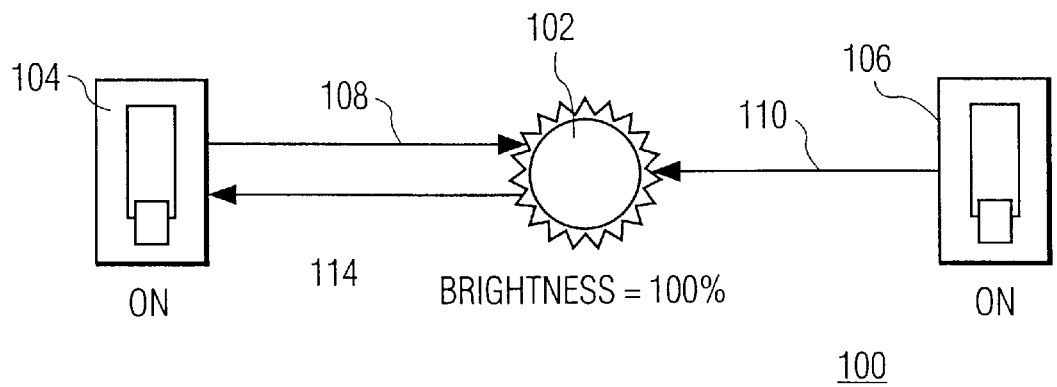

FIGS. 1–3 are diagrams illustrating unidirectional property routes in a system 100 that has a light 102 which is controllable by switches 104 and 106. In a home automation system, light 102 and switches 104–106 are represented as software objects that have controllable properties. A property of an object can be set, e.g., by an appropriate call to that property. In the following, the physical components 102–106 and the software objects representing them will be indicated by the same reference numeral. System 100 further has a route manager (not shown). The route manager is a service for registering and invoking routes. A route establishes, as explained above, a functional link between a property of a source object and a property of a destination object. When the state of the source property changes the route associated with this change gets invoked through the route manager. The route is executed and propagates the state change to the destination property so as to have the latter undergoing a corresponding state change.

In FIG. 1 the property state "on/off" of switch 104 is functionally connected to the property "brightness" of light 102 via a route 108 registered by a first client application. Similarly, the property state "on/off" of switch 106 is connected to the property "brightness" of light 102 via a route 110 that has been registered by a second client application. Initially, switches 104 and 106 are in the "off" state and the brightness of light 102 is at 0%.

In FIG. 2 switch 106 changes its state from "off" to "on". Route 110 gets executed and the state change is propagated to light 102 to turn on light 102 whose brightness goes to up 100%. However, the state of switch 104 is not updated.

In FIG. 3, a route 114 has been registered, connecting the property "brightness" of light 102 to the state of switch 104 in order to keep the states of components 102–106 consistent with one another. In many cases such behavior seems counter-intuitive: it requires the user or the application developer to make a conscious effort in order to keep the components synchronised. It also requires the system to use complicated logical rules to avoid circular route propagation. For example, route 114 needs to be checked for the originator of the property change by keeping track of the route execution graph.

Figure 4:
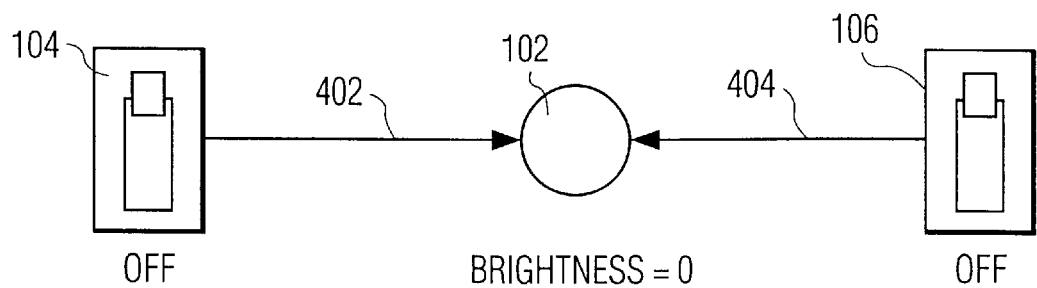
FIGS. 4–9 are diagrams illustrating the two-way routes in control systems of the invention.
Figure 5:
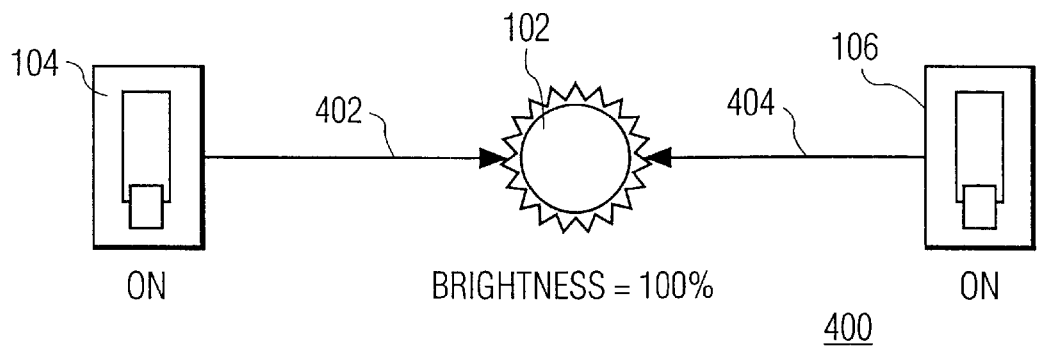

FIGS. 4 and 5 are block diagrams of an information processing system 400 in the invention. To a certain extent, system 400 is similar to system 100 of FIGS. 1–3. System 400 comprises switches 104 and 106 and light 102 introduced above. However, in order to automatically synchronize the states of switches 104–106 and of light 102, system 400 has the properties connected by two-way routes 402 and 404. A two-way route gets invoked under the condition that the change of state was not caused by the property route itself. This is explained as follows.

FIG. 4 shows system 400 in a state wherein both switches 104 and 106 are in the "off" state. When switch 104 changes its state from "off" to "on", as in FIG. 5, the change is automatically propagated to the property "brightness" of light 102 via route 402. The change of state of the property "brightness" invokes route 404, but not route 402 since the latter originated the change in "brightness". Route 404 changes the state of switch 106 so as to be synchronous with that of switch 104. There is no need to check for circular propagation between "brightness" and the state of switch 106, since the state change of switch 106 is caused by the same logical route 404. Using the conditional invoking of the two-way routes causes the properties to be synchronized in an easy to use and intuitive manner.

Figure 6:
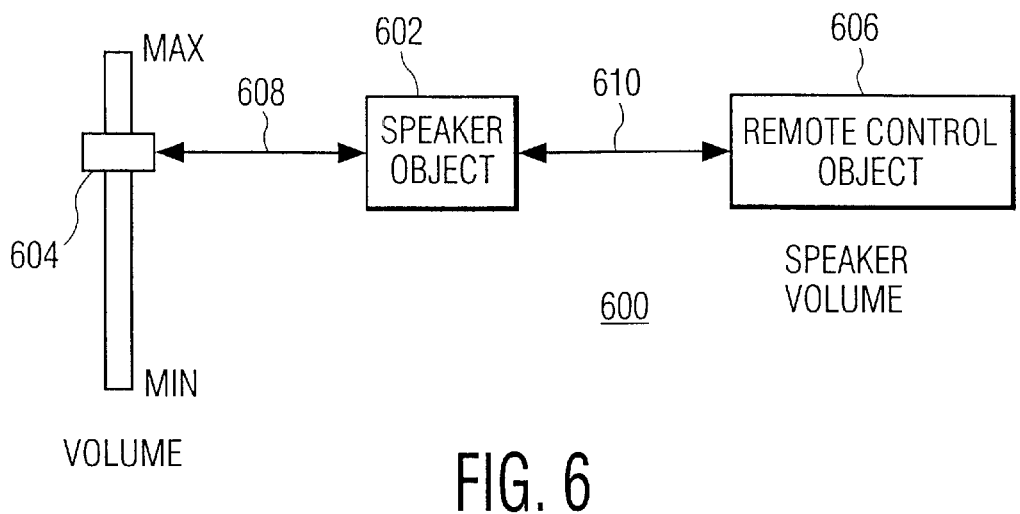

FIG. 6 is a diagram of an information processing system 600 with two-way route usage. System 600 comprises a loudspeaker (not shown) represented by software object 602. System 600 further comprises a first sound volume controller, e.g., a slider on a front panel of an audio amplifier (not shown) represented by software object 604, and a remote control device with a GUI element (not shown) for control of the sound volume of the loudspeaker. The GUI control element has a software object representation 606. In order to keep the remote control 606 and the slider 604 synchronized, their "volume" properties are connected to speaker object 602 by two-way routes 608 and 610. For example, if the user adjust the volume by changing the state of slider 604, route 608 gets invoked and speaker object adjust its state accordingly. The change in state of speaker object 602 causes route 610 to be invoked. Route 610 causes GUI object 606 to adopt an appropriate state change. The change of GUI object 606 is caused by two-way route 610. Accordingly, this change of GUI element 606 does not in turn invoke route 610 in order to propagate a change back to speaker object 602. Therefore, no matter what the origin of the change in speaker volume, the states of objects 602, 604 and 606 are always consistent with one another.

Figure 7:
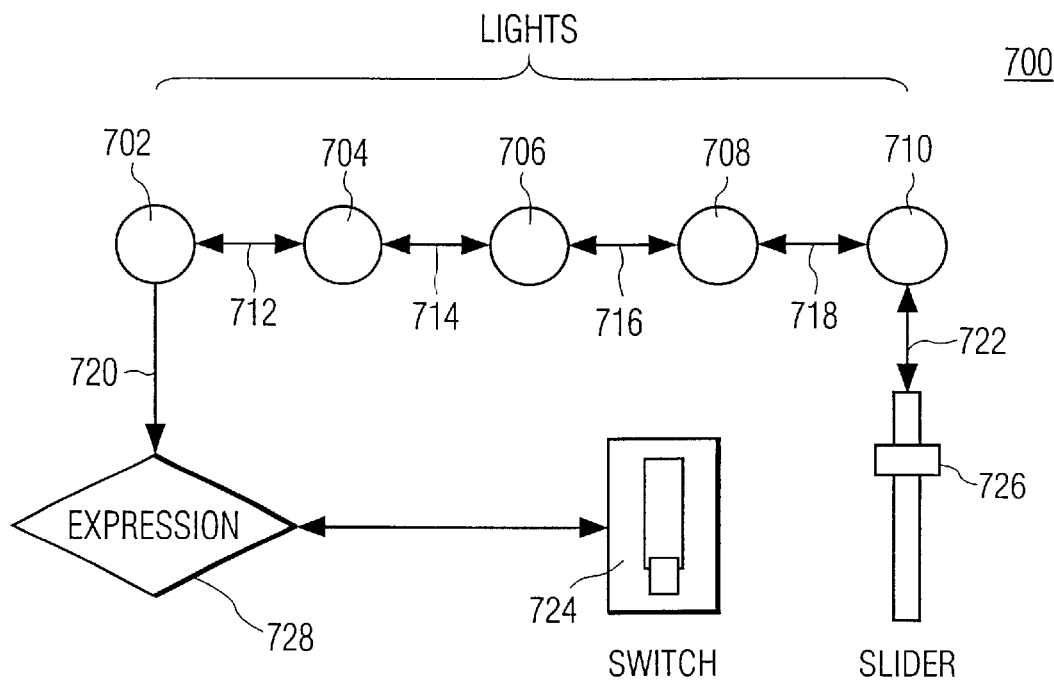
Figure 8:
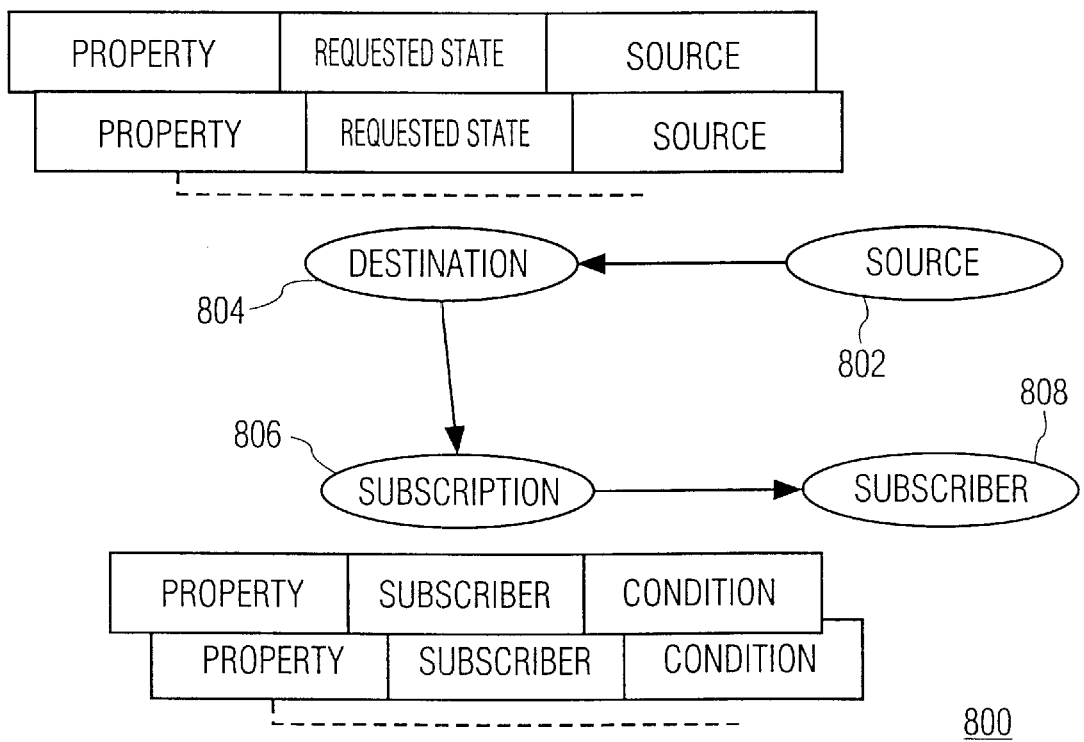
Figure 9:
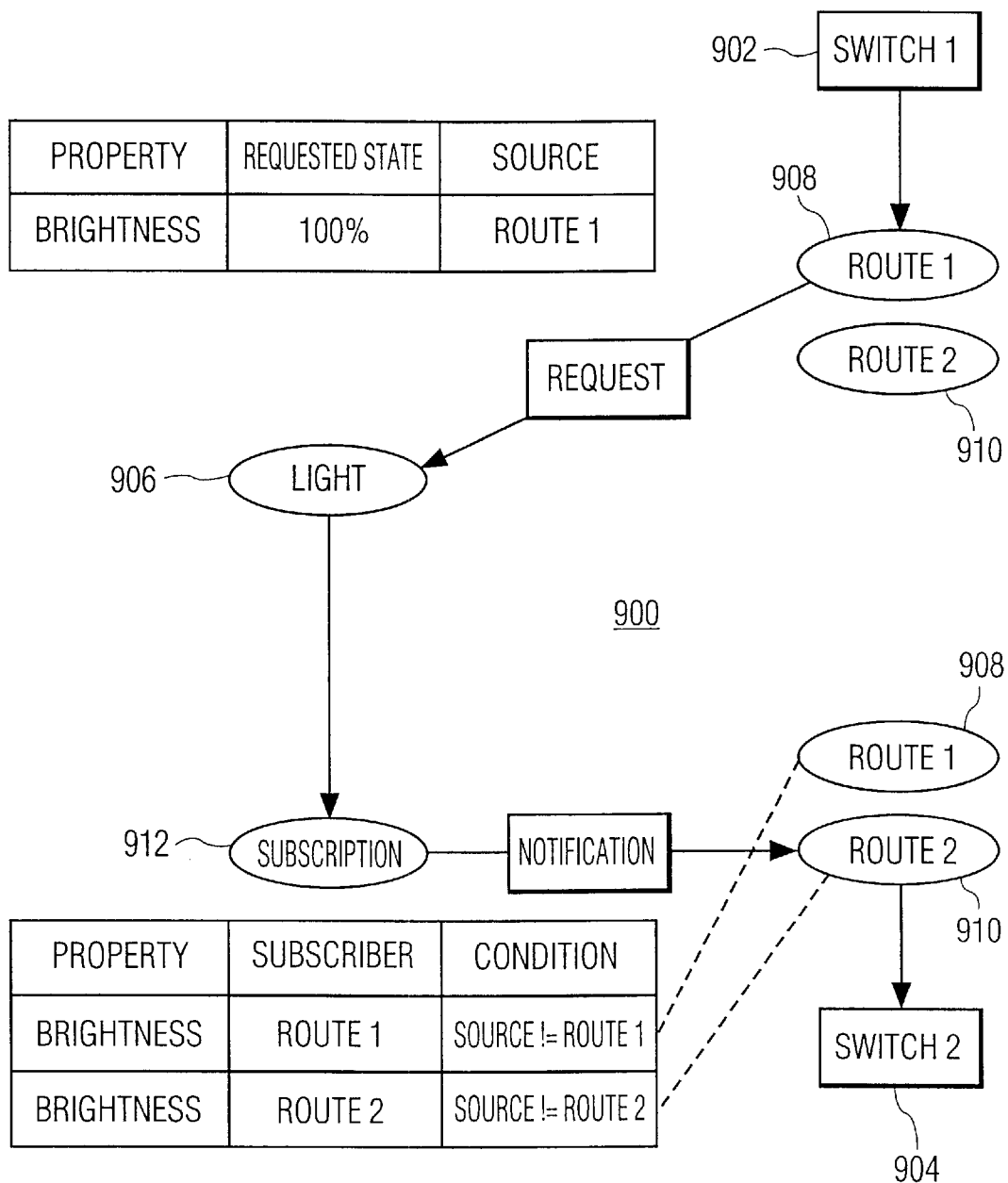

FIG. 7 is a diagram of an information processing system 700 to illustrate that two-way routes can also be used for grouping software objects. System 700 comprises multiple software objects 702, 704, 706, 708 and 710 representing multiple lights. Objects 702–710 are connected in a chain by two-way routes 712, 714, 716, 718, 720 and 722 between a control object 724 (here for an "on/off" switch) and a control object 726 for a slider that controls the brightness of the lights in a continuous fashion. The extreme positions of slider 726 correspond to the "on" and "off" states of switch 724. A position between the extremes does not have an equivalent state of switch 724. Accordingly, a logic expression 728 is inserted in the control path that sees to it that any change in position of slider 726, apart from a change to its lowest position, does not cause switch 724 to adopt the "off" state. FIGS. 8–9 explain the two-way route in more detail from the programmer's point of view and with reference to a diagram that illustrates a possible implementation 800. Implementation 800 is based on a mechanism for changing an object property and for notification of objects. Implementation 800 contains four basic elements: a source object 802, a destination object 804, a subscription object 806 and a subscriber object 808. Source 802 is an object that requests a property change on another object, referred to as the destination. Destination 804 is an object that owns the property to be changed and that is responsible for changing it. Subscription object 806 notifies clients, who have declared being interested in the property change. Subscription object 806 can be combined with destination object 804. Subscriber 808 is an object that has registered as a client with subscription object 806 as being interested in this property change. The mechanism works as follows. Source object 802 requests a property change. Destination object 804 registers the request. The request specifies the property, its desired state and the origin of the request, here source 802. Destination 804 performs or initiates the change. When the change is complete, destination object 804 notifies subscription object 806 of the change and indicates the origin of the change, here source 802. Subscription object 806 checks for subscribers, here subscriber 808, interested in the property change. Subscribers indicate in which property change (event) they are interested and may specify the condition(s), if any, under which they want to be notified of the change. If no condition has been specified by a subscriber, the latter is notified of all changes in the property.

FIG. 9 implements the configuration of FIG. 8 using the two-way route approach in the invention. FIG. 9 is a diagram of a system 900 for control of a light. System 900 comprises the following software objects: a switch 902, a switch 904, a light 906, a first two-way route 908 and a two-way route 910. When first two-way route 908 has been registered with the system it can be added to a light's subscription object 912 with interest in the light's property "brightness" and the condition: source is not equal to route 908. Similarly, second two-way route 910 is added with the condition: source is not equal route 910. Now, when switch 902 changes its state from "off" to "on", route 908 is executed and it requests a change in the property "brightness" of light 906. Light 906 registers this request, specifying "brightness" as the property to be changed, with 100% as the requested state and route 908 as the source. When the change has been completed, light 906 notifies its subscription object 912 about the change and specifies route 908 as the source. Subscription object 912 looks. up all the relevant subscriptions, and chooses to notify only route 910, since the condition Source !=Route 910 evaluates to "True", and the condition Source !=Route 908 evaluates to "False". Route 910 notifies switch 904 about the change, which in turn changes its state to "on". As demonstrated, this mechanism synchronizes switches 902 and 904 while preventing circular reference. Similarly, when switch 904 changes its state, route 910 is executed, requesting the change in "brightness". After the change is complete, subscription object 912 evaluates the subscriptions and conditions, and propagates the change through to route 908.

Other notification/circular reference resolution mechanisms can be implemented. The key requirement of the implementation is that a two-way route has to be uniquely identified. This identifier can be implemented as an object (see above example), or as a unique ID, or both. The system implementor chooses the model based on available resource and programming techniques. Condition evaluation does not have to happen in the subscription object. Subscribers could perform the evaluation themselves, as long as the source information is passed along with the notification. In such case, comparing the source (ID) and the destination (ID) can stop property change propagation at any point along the notification chain.

Figure 10:
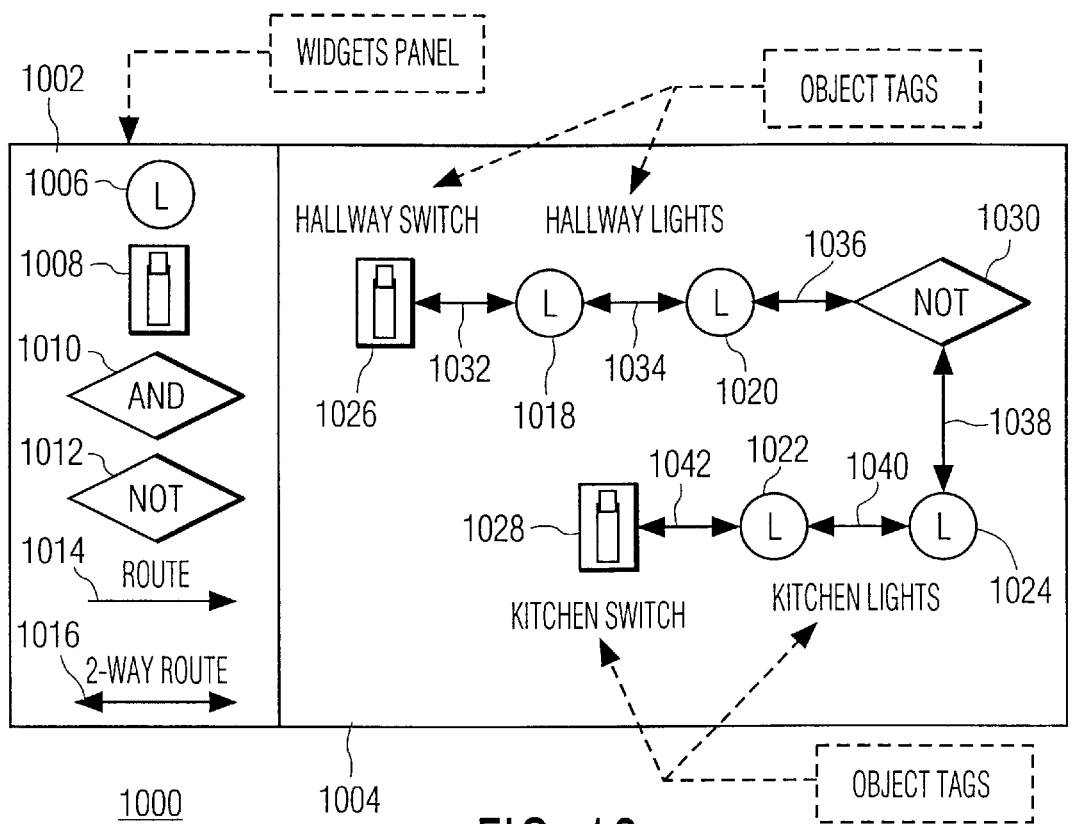
FIGS. 10–12 are diagrams explaining some aspects of configuring a control system.
Figure 11:
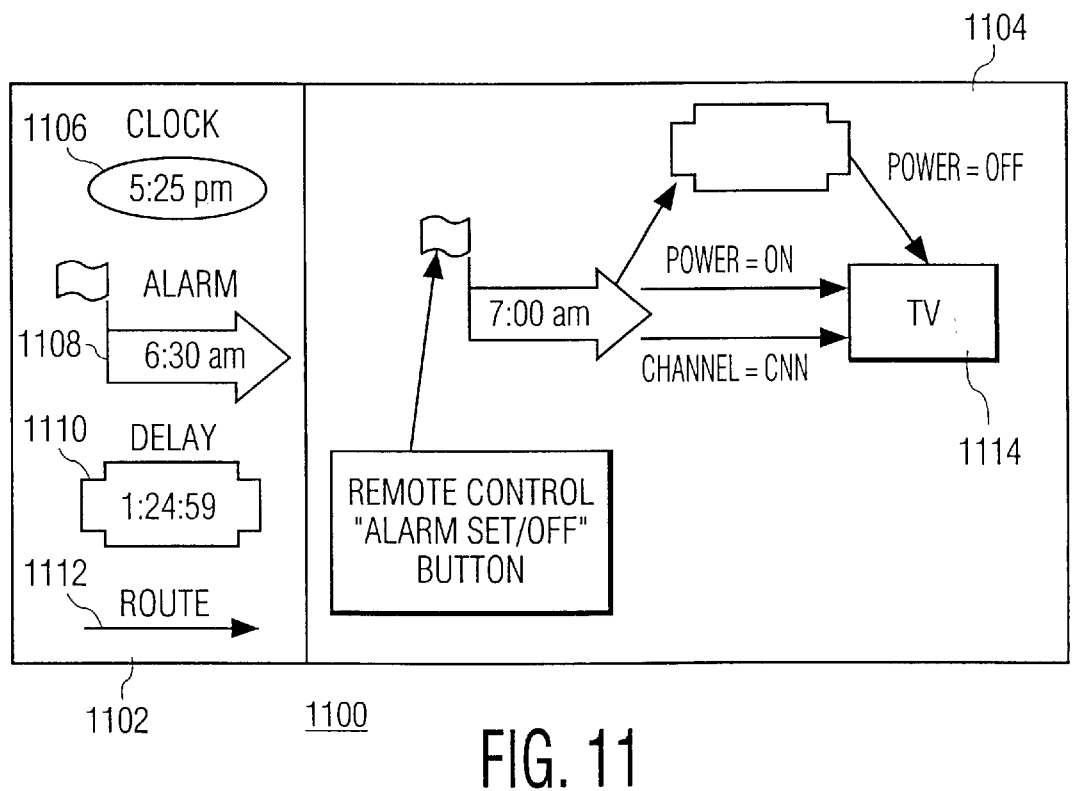
Figure 12:
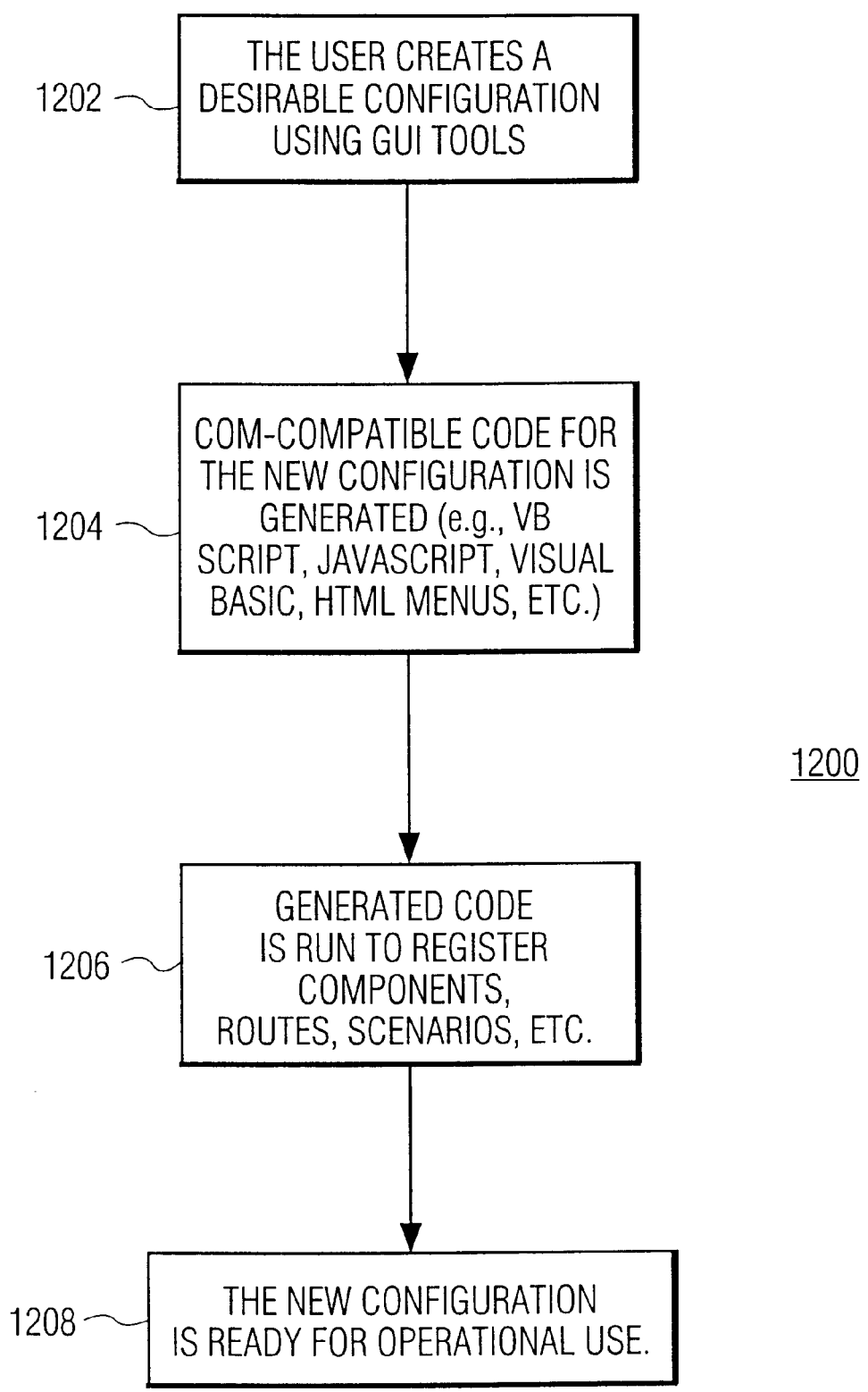

FIGS. 10–12 illustrate the configuring of a system in the invention using a GUI application such as Visio, Microsoft's Word drawing tools and Visual Basic, etc. These software applications provide a programming environment with a graphical user interface for choosing and modifying preselected portions of code. For example, selected widgets can be dragged and dropped in order to create a visual representation of a configuration (e.g., of a program, a CAD drawing or data base), i.e., of functionally interconnected and cooperating components. The usability of these software applications is well suited to the capabilities of the end-user of the home automation system. The visual representation of the interconnected components together with a configuration tool in the application enables the user to graphically manage setting up the system in the invention. The drag-and-drop method lets the user create a visual representation and the configuration tool creates and registers the relevant objects routes and scenarios with the system, which in the end controls the physical devices. For background information on scenarios, see U.S. Ser. No. 09/165,683 filed Oct. 2, 1998 for Yevgeniy Shteyn for CALLS IDENTIFY SCENARIO FOR CONTROL OF SOFTWARE OBJECTS VIA PROPERTY ROUTES, herein incorporated by reference. The latter patent document relates to an information processing system with first and second physical components represented by first and second software objects. Both objects have properties that are changeable through calls to the objects. The system enables registering a property route linking a first property of the first object to a second property of the second object so that a change in the first property causes the second call being issued to the second object upon invoking the property route. The input call to the first object comprises an identifier enabling to conditionally invoke the route. In this manner, routes belonging to different scenarios are being kept independent so that the system operates more reliable that without scenario identifiers.

Within the context of the above, please note that a cluster of software objects can also be considered a software object.

The GUI application defines a number of standard software objects, such as a TV, a tuner, a light, a switch, a timer, a logic expression, etc. It also encourages creation of customized objects, representing devices, software elements and groups of objects. So, from the developer's point of view, the system enables creation of a number of GUI-based home automation configuration applications as mentioned. Such application uses the familiar drag-and-drop (boxes-and-lines) approach, where devices are represented by widgets (boxes) and routes/connections between their properties are represented by lines. For this approach to be user-friendly, a number of utility objects need to be defined. The two-way route is one of those objects. It enables intuitive use of a two-way connection between synchronized properties/objects. It also allows for easy creation of groups of objects that behave in unison. Another positive effect of a two-way route is its use for resolving circular reference as explained with reference to, e.g., FIGS. 8 and 9.

FIG. 10 is a diagram illustrating a GUI 1000 for the user to configure a system. GUI 1000 comprises a widget menu panel 1002, from which the user can select any widget by dragging it to the a configuration panel 1004 and drop the selected widget at a desired position. Here, widget menu panel 1002 has graphical representations for a light 1006, a switch 1008, logic expressions 1010 and 1012, an ordinary route 1014 and a two-way route 1016. Configuration panel 1004 shows a configuration created through the drag-and-drop method for control of hallway lights 1018 and 1020, and kitchen lights 1022 and 1024 via switches 1026 and 1028, a logic "NOT" expression 1030, and two-way routes 1032, 1034, 1036, 1038, 1040 and 1042. In this configuration, kitchen lights 1022 and 1024 are turned off when hallway lights are turned on and vice versa FIG. 11 is a diagram of another example of a GUI 1100 for configuring a control system.

GUI 1100 has a menu panel 1102 with time-related widgets that in this example are used to configure a control system, through drag-and-drop, for turning on or off a TV at user-programmable or user-selectable moments in time. Note that GUI 1000 shown in FIG. 10 and GUI 1100 of FIG. 11 preferably are organized as parts of the same software application wherein the user selects in a convenient manner the appropriate panels to set various configurations. A specific panel clusters software objects representing components whose functionalities in operational use tend to be interrelated such as a cluster for lights and switches, a cluster for recording a TV program comprising, e.g., TV functions, VCR functions and electronic program guide (EPG) functions. Configuration panel 1104 shows a graphical representation of a control system thus configured. Menu panel 1102 comprises a widget 1106 for a system clock, a widget 1108 for an alarm or time-related trigger, a widget 1110 for a time delay, and a widget 1112 for a route. The properties of the objects represented by widgets 1108–1112 are user-programmable. The end-user creates the configuration shown in panel 1104 as follows. The intention is to turn on a TV tuner (not shown) at a certain moment in time, e.g., at 7:00am, and to turn it off later at a certain moment in time, e.g., 45 minutes later. To this end, the user selects a menu panel for audio/video equipment (not shown), selects a TV widget from the appropriate menu and positions it on configuration panel 1104 as TV object 1114 through drag-and-drop. Then, the user selects alarm widget 1108, sets the alarm time, via a convenient entry to GUI 1100 to be 7:00am and drags-and-drops it into panel 1104 where it appears as object 1116. The alarm triggers the turning on of the TV at the time selected. In this example, alarm object 1116 is, when programmed as a part of the configuration in panel 1104, functionally connected to system clock 1106. Alternatively, the icon of system clock 1106 is explicitly dragged and dropped into configuration panel 1104 and connected to alarm object 1116 via an appropriate route so as to provide the correct time to alarm object 1108. Then, a delay object 1118 is created from the menu panel 1102 by selecting and programming template delay object 1110. A first route 1120 is then made to connect alarm 1116 to TV object 1114. Route 1120 propagates the trigger produced by alarm object 1116 to TV object 1114 in order to thus turn on the real TV. The user then programs a second route 1122 that is configured to connect alarm object 1116 to TV object 1114 so as to set the TV tuner to a pre-specified channel, e.g., CNN. A third route 1124 is arranged by the user between alarm object 1116 and delay object 1118 in order to start the clock ticking backwards from the amount specified in delay object 1118, here 45 minutes. The user sets up a fourth route 1126 between delay object 1118 and TV 1114. The moment delay object 1118 has counted back to zero delay object changes its state that is propagated via route 1126 to TV object in order to turn off the real TV set. In a sense, GUI's 1000 and 1100 of FIG. 10 and 11 enable the user to create a macro by manipulation of graphical representations of software objects and connecting them through user-programmable routes that, by the way, are also software objects.

FIG. 12 is a flow diagram for a method 1200 with the main steps in creating a scenario or home automation system. In step 1202 the user creates the graphical representation for a new system configuration as discussed with reference to FIGS. 10 and 11. In step 1204, code is generated for the new configuration (e.g., COM-compatible code) via, for example, VBScript, JavaScript, Visual Basic or HTML menus. In step 1206 the generated code is then run to register the various objects with the system's directory (see, e.g., the Background Art Section above) so as to integrate the cluster as a new functionality in the home automation system. Upon registering, the new configuration is ready for operational use as indicated in step 1208. Execution of steps 1202, 1204 and 1206 may overlap in time or may be performed sequentially. The configuring application may run locally or on remote server accessible via the Internet. In the latter case, the information gathered at server may be used for user-profiling for future use. Code optimized for the particular end-user's system or preferences can thus be generated by a dedicated server (VBScript or JavaScript).

Within this context, see U.S. Ser. No. 09/160,490 filed Sep. 25, 1998 for Adrian Turner et al. for "CUSTOMIZED UPGRADING OF INTERNET-ENABLED DEVICES BASED ON USER-PROFILE", and U.S. Ser. No. 09/189,535 filed Nov. 10, 1998 for Yevgeniy Shteyn for "UPGRADING OF SYNERGETIC ASPECTS OF HOME NETWORKS", herein incorporated by reference. These patent documents relate to a server system that maintains a user profile of a particular end-user of consumer electronics network-enabled equipment and a data base of new technical features for this type of equipment. If there is a match between the user-profile and a new technical feature, and the user indicates to receive information about updates or sales offers, the user gets notified via the network of the option to obtain the feature. The latter document relates further to a server that has access to an inventory of devices and capabilities on a user's home network. The inventory is for example a look-up service as provided by HAVi or Jini architectures. The server has also access to a data base with information of features for a network. The server determines if the synergy of the apparatus present on the user's network can be enhanced based on the listing of the inventory and on the user's profile. If there are features that are relevant to the synergy, based on these criteria, the user gets notified.

I claim:

1. An information processing system comprising:
   first and second functionalities, represented by first and second software objects, respectively, that have first and second settable properties, respectively;
   a route manager for enabling invoking a property route between the first and second properties for enabling keeping states of the properties consistent with each other; wherein:
     the route is executed to change the state of the first property upon a change of the state of the second property if the change of the state of the second property was caused by an effect other than the route itself; and
     the route is executed to change the state of the second property upon a change of the state of the first property if the change of the state of the first property was caused by an effect other than the route itself.

2. The system of claim 1, comprising:
   a third functionality represented by a third software object that has a third settable property; and wherein:
     the route manager is capable of invoking a second property route between the second and third properties for enabling keeping states of the second and third properties consistent with each other;
     the second route is executed to change the state of the second property upon a change of the state of the third property if the change of state of the third property was caused by an effect other than the second route itself; and
     the second route is executed to change the state of the third property upon a change of the state of the second property if the change of state of the second property was caused by an effect other than the second route itself.

3. A method of enabling controlling an information processing system that comprises first and second functionalities, represented by first and second software objects, respectively, that have first and second settable properties, respectively, wherein the method comprises:
   enabling invoking a property route between the first and second properties for enabling keeping states of the properties consistent with each other;
   enabling executing the route to change the state of the first property upon a change of the state of the second property if the change of the state of the second property was caused by an effect other than the route itself; and
   enabling executing the route to change the state of the second property upon a change of the state of the first property if the change of the state of the first property was caused by an effect other than the route itself.

4. The method of claim 3, wherein:
   the system has a third functionality represented by a third software object that has a third settable property; and wherein the method comprises:
   enabling invoking a second property route between the second and third properties for enabling keeping states of the second and third properties consistent with each other;
   enabling executing the second route to change the state of the second property upon a change of the state of the third property if the change of state of the third property was caused by an effect other than the second route itself; and
   enabling executing the second route to change the state of the third property upon a change of the state of the second property if the change of state of the second property was caused by an effect other than the second route itself.

5. An information system comprising:
   first and second functionalities, represented by first and second software objects, respectively, that have first and second settable properties, respectively, the first and second functionalities for controlling a state of a same device;
   a route manager for enabling invoking a property route between the first and second properties for enabling keeping states of the properties consistent with each other,
   wherein the route is executed to change the state of the first property upon a change of the state of the second property if the change of the state of the second property was caused by an effect other than the route itself, and
   the route is executed to change the state of the second property upon a change of the state of the first property if the change of the state of the first property was caused by an effect other than the route itself.

* * * * *